(12) United States Patent
Wang et al.

(10) Patent No.: US 9,691,123 B2
(45) Date of Patent: Jun. 27, 2017

(54) INSTRUMENTATION OF GRAPHICS INSTRUCTIONS

(71) Applicant: Intel Corporation, Santa Clara, CA (US)

(72) Inventors: Zhi Wang, Beijing (CN); Yao Zu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/778,508

(22) PCT Filed: Dec. 15, 2014

(86) PCT No.: PCT/CN2014/093867
§ 371 (c)(1),
(2) Date: Sep. 18, 2015

(87) PCT Pub. No.: WO2016/095091
PCT Pub. Date: Jun. 23, 2016

(65) Prior Publication Data
US 2016/0358304 A1    Dec. 8, 2016

(51) Int. Cl.
*G06T 1/20* (2006.01)
*G06F 7/00* (2006.01)
(Continued)

(52) U.S. Cl.
CPC .................. *G06T 1/20* (2013.01); *G06F 7/00* (2013.01); *G06F 11/3636* (2013.01); *G06T 1/60* (2013.01)

(58) Field of Classification Search
CPC .......... G06T 1/20; G06T 1/60; G06F 11/3636
See application file for complete search history.

(56) References Cited

U.S. PATENT DOCUMENTS 6,204,864 B1    3/2001  Chee
2009/0106735 A1    4/2009  Eves et al.

FOREIGN PATENT DOCUMENTS

CN    1959653 A    5/2007
CN    104185444 A    12/2014

OTHER PUBLICATIONS

Dietrich et al., Phase-Based Profiling in GPGPU Kernels, Dec. 2012 41st International Conference on Parallel Processing Workshops, 414-423.*

(Continued)

*Primary Examiner* — Robert Craddock
(74) *Attorney, Agent, or Firm* — Schwabe, Williamson & Wyatt, P.C.

(57) ABSTRACT

Embodiments of graphics instruction instrumentor ("GII") and a graphics profiler ("GP") are described. The GII may facilitate profiling of execution of graphics instructions by one or more graphics processors. The GII may identify target graphics instructions for which execution profile information is desired. The GII may store instrumentation graphics instructions in a graphics instruction buffer. The instrumentation graphics instructions may facilitate the GP in collecting graphics profile information. For example, timestamp-storage instructions may be store timestamps before and after execution of the target graphics instructions. The GII also may store an interrupt-generation instruction to cause an interrupt to be sent to the GP so that the GP may begin collection of graphics profile data. The GII may store an event-wait instruction to pause the graphics processors until an event is received. Other embodiments may be described and claimed.

14 Claims, 8 Drawing Sheets

(51) Int. Cl.
*G06F 11/36* (2006.01)
*G06T 1/60* (2006.01)

(56) References Cited

OTHER PUBLICATIONS

Mangharam et al., Anytime Algorithms for GPU Architectures, Dec. 2011, 32nd IEEE Real-Time Systems Symposium, 47-56.*
International Search Report and Written Opinion mailed Aug. 26, 2015 for International Application No. PCT/CN2014/093867, 12 pages.

* cited by examiner

Fig. 1
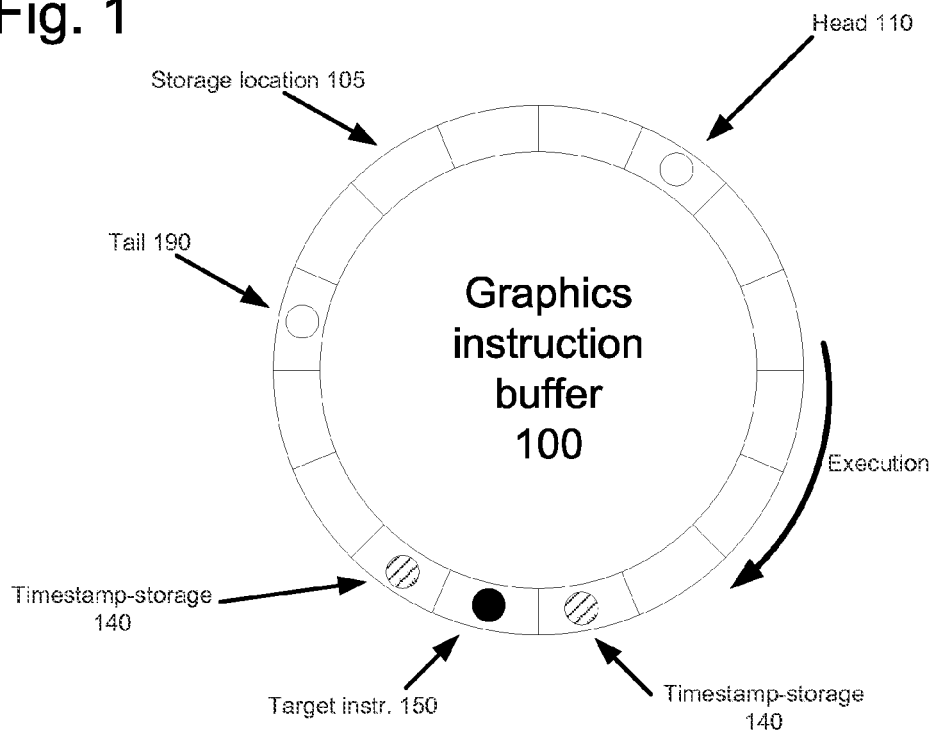
Example 1
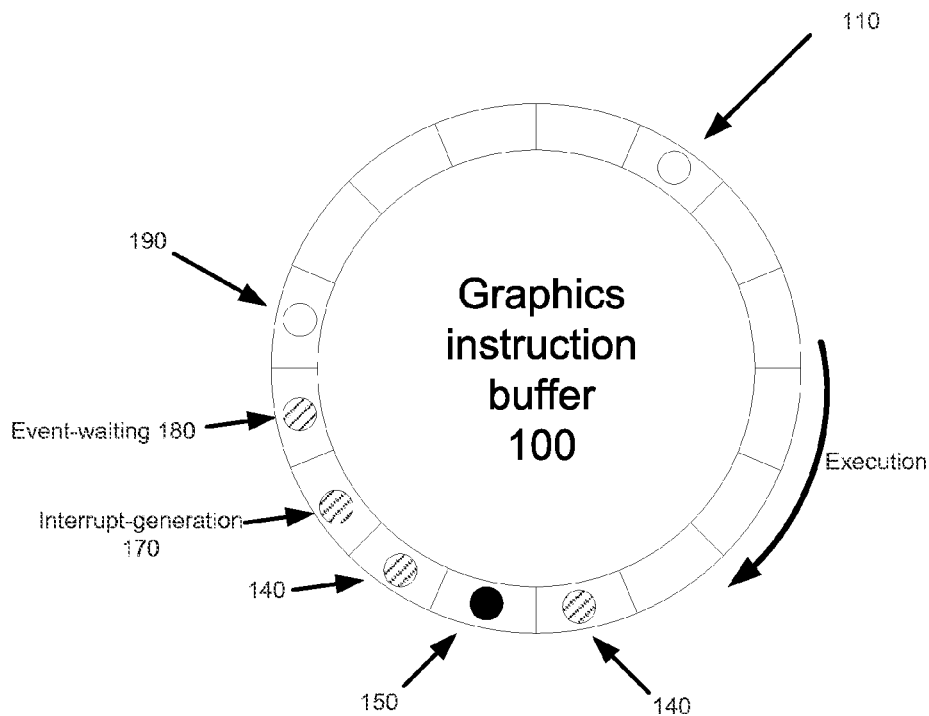
Example 2

INSTRUMENTATION OF GRAPHICS INSTRUCTIONS

CROSS REFERENCE TO RELATED APPLICATIONS

The present application is a national phase entry under 35 U.S.C. 0371 of International Application No. PCT/CN2014/093867, filed Dec. 15, 2014, entitled "INSTRUMENTATION OF GRAPHICS INSTRUCTIONS", which designated, among the various States, the United States of America. The Specification of the PCT/CN2014/093867 Application is hereby fully incorporated by reference.

TECHNICAL FIELD

The present disclosure relates to the field of data processing, in particular, to apparatuses, methods and storage media associated with instrumentation of graphics instructions.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many computing systems include one or more graphics processors which execute graphics instructions to render graphics and video for users. During development of applications which include graphics, a developer may wish to have information about execution of the instructions on the one or more graphics processors, such as execution time, memory accesses, resource waits, etc. However, because these instructions are executed on a graphics processor environment, which may be separate from other computer processors in which analysis may be performed, it may be difficult for developers to obtain such information. For example, if a developer uses another computing processor (such as a processor running an operating system) to poll for graphics execution information, the other processor may not have the timing knowledge of when particular instructions are being executed by the one or more graphics processors. In such scenarios, the developer may not be able to accurately target the particular graphics instructions which they need to fine tune their application. This can prevent accurate profiling of graphics execution and stymie efforts to improve graphics performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 1 illustrates example graphics instruction buffers for which instrumentation instructions have been added, in accordance with various embodiments.

DETAILED DESCRIPTION

Figure 2:
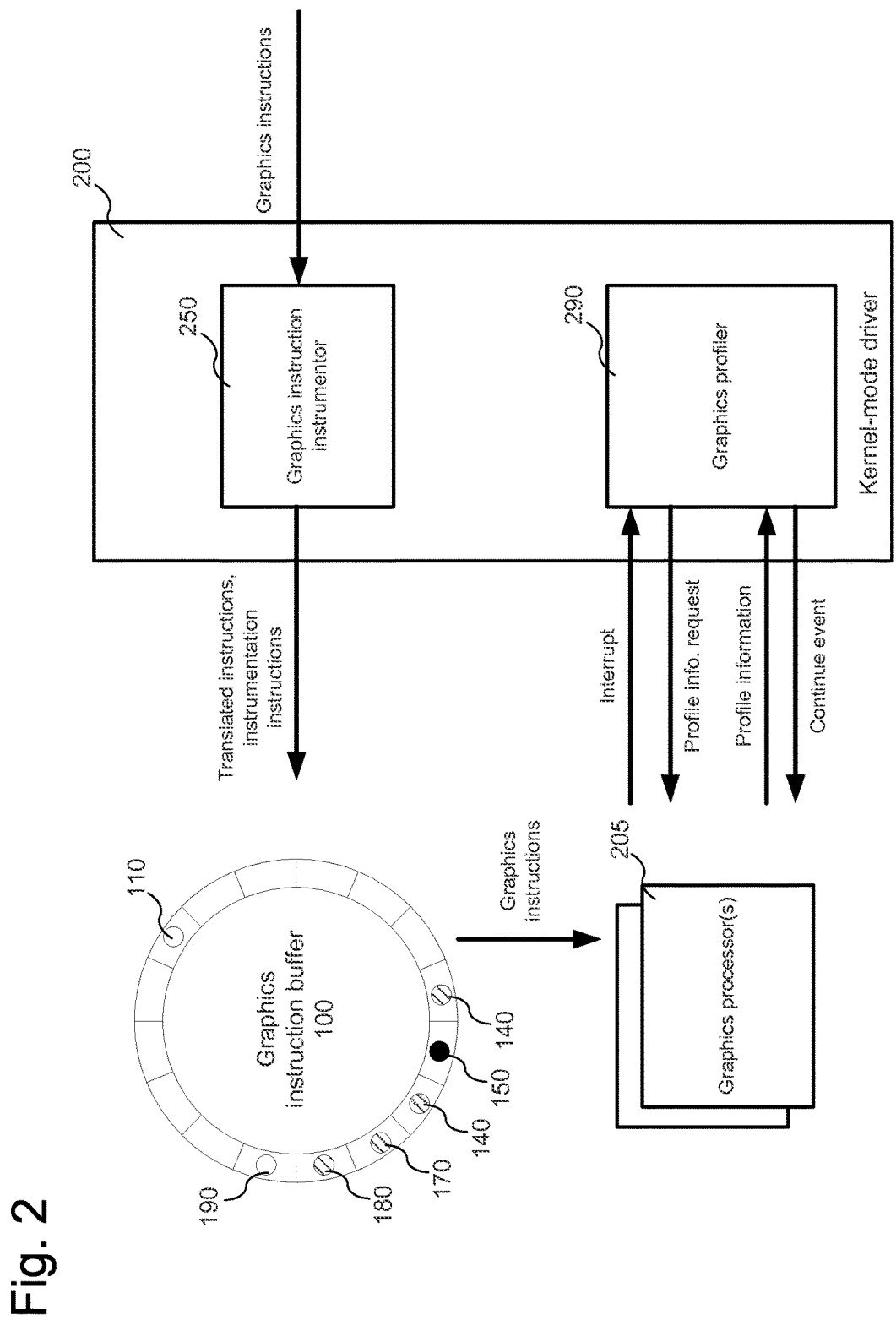
FIG. 2 illustrates an example arrangement and information flows for a graphics instruction instrumentor and graphics profiler to profile execution of graphics instructions in a kernel-mode driver, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations my be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

Methods, apparatuses, systems, and computer-readable media are described herein for a graphics instruction instrumentor ("GII") and a graphics profiler ("GP"). In various embodiments, the GII may be configured to facilitate profiling of execution of graphics instructions by one or more graphics processors on a computing device. In various embodiments, the GII may be configured to identify graphics instructions to be executed by graphics processors. For example, the GII may identify target graphics instructions for which execution profile information is desired. The GII may be configured to then store instrumentation graphics instructions in a graphics instruction buffer from which the one or more graphics processors is executing graphics instructions.

various embodiments, the instrumentation graphics instructions may be configured to facilitate the GP in collecting graphics profile information. For example, the GII may be configured to store timestamp-storage instructions in the graphics instruction buffer. The timestamp-storage instructions may be stored in the graphics instruction buffer such that a timestamp is stored by the one or more graphics processors before and after execution of the target graphics instructions. The two timestamps may thus be used, in various embodiments, such as by the GP, to determine an execution time for the target graphics instructions. Additionally, in various embodiments, the GII may store an interrupt-generation instruction and an event-wait instruction in the graphics instruction buffer. The interrupt-generation instruction may cause an interrupt to be sent to the GP so that the GP may begin collection of graphics profile data. The event-wait instruction may cause the one or more graphics processors to pause execution until an event is received by the one or more graphics processors, thus preventing further execution of graphics instructions until the GP has collected graphics profile information. Other embodiments and particular examples and implementations are described herein.

Referring now to FIG. 1, example graphics instruction buffers 100 ("GIB 100s") for which instrumentation graphics instructions have been added are illustrated in accordance with various embodiments. It may be noted that, in FIG. 1, the example graphics instruction buffers 100 include ring buffers. Thus, in the examples, the GIB 100 may include multiple graphics instruction storage locations, such as storage location 105, in which graphics instructions may be stored. The GIB 100 may also include pointers which indicate ahead storage location 110 and a tail storage location 190 (marked with open circles) which may point to particular storage locations 105. Execution of graphics instructions may thus proceed from the head location 110 through the various storage locations in the GIB 100, updating the head storage location 110 as each graphics instruction is executed, until the tail storage location 190 is reached. When new graphics instructions are added to the GIB 100, they may be added just past the tail storage location 190 and the tail storage location 190 may be updated to the storage location at the end of the newly added graphics instructions. This may proceed around the ring that forms the GIB 100 in a continuous fashion, thus forming a "ring buffer". It may be noted, however, that while the illustrated example graphics instruction buffers 100 include ring buffers, in various embodiments, other buffer implementations may be utilized.

In Example 1, a target instruction 150 ("TI 150") has been stored in the GIB 100 for execution by the one or more graphics processors; the TI 150 is marked with a solid circle. In various embodiments, the TI 150 may be a graphics instruction for which graphics profile information is desired. For example, if a developer of graphics software wishes to determine an execution time for a particular graphics instruction, the GII may identify the graphics instruction as a TI 150. In some embodiments, various graphics instructions may be identified as TI 150s, up to and including all graphics instructions in an application, or a subset thereof.

As illustrated, the TI 150 may be stored between the head storage location 110 and the tail storage location 190 so that it may be executed by the one or more graphics processors as execution proceeds in various embodiments, the GII may insert instrumentation graphics instructions into the GIB 100 in association with the TI 150. For example, in Example 1, the GII has inserted two additional timestamp-storage instructions 140 ("TSI 140s") in storage locations on either side of the TI 150. In various embodiments, each TSI 140 may be configured to cause the one or more graphics processors to store a current timestamp, such as a current clock value of the one or more graphics processors. Because the timestamps are recorded immediately before and immediately after the execution of the TI 150, these timestamps may be used by the GP to determine an execution time for the TI 150. In various embodiments, the TSI 140 may be implemented as a register-value-storage instruction to store a register value of the one or inure graphics processors, in this particular case, a processor clock value or other time value. In some embodiments, such register-value-storage instructions may be used, in addition to or in lieu of the TSI 140, to store other information. For example, register-value-storage instructions may store computational values obtained during execution which may be used to determine other, not-necessarily-time-related information related to execution of graphics instructions.

Example 2 shows additional instrumentation graphics instructions which may be inserted into the GIB 100 by the GIL For example, in various embodiments, the GU may insert an interrupt-generation instruction 170 ("IGI 170") into the GIB 100. In various embodiments, the IGI 170 may be configured such that, when the one or more graphics processors execute the IGI 170, an interrupt is sent from the one or more graphics processors to the GP. In various embodiments, this IGI 170 may be inserted after the second TSI 140.

In various embodiments, the GP may operate on one or more computer processors other than the one or more graphics processors. Because the GP is executed outside of the one or more graphics processors, the IGI 170 may be utilized to send the interrupt so that the OP may become aware that the TI 150 has executed and timestamps have been stored so that the OP may collect graphics profile information for the TI 150. in various embodiments, the GII may also be configured to insert an event-waiting instruction 180 ("EWI 180"), which may cause the one or more graphics processors to pause execution until receipt of a specified event. In various embodiments, the GP may then be configured to provide a resume-execution event to the one or inure graphics processors after collection of graphics profile information. In various embodiments, by pausing execution of the one or more graphics processors, the GP may be facilitated in collecting graphics profile information for the one or more graphics processors without the information being affected by further execution of graphics instructions.

FIG. 2 illustrates an example arrangement and information flows for a graphics instruction instrumentor 250 ("GII 250") and a graphics profiler 290 ("GP 290") to profile execution of graphics instructions in a kernel-mode driver 200, in accordance with various embodiments. In embodiments, as illustrated in FIG. 2, a kernel-mode driver 200 (KMD 200) may include a graphics driver operating in an operating system that is configured to receive graphics instructions, such as by applications executing in the operating system or by the operating system itself, and to provide these graphics instructions to a GIB 100. The instructions may then, in turn, be executed from the GIB 100 by one or more graphics processors 205, In various embodiments, the KMD 200 may be configured to directly map instructions into the GIB 100. In various embodiments, the GII 250 may be configured to write translated graphics instructions to the GIB 100, such as TI 150. The GII 250 may also be configured, as discussed above, to store instrumentation graphics instructions in the GIB 100, such as TSI 140s, IGI 170, and EWI 180. In other embodiments, the GII 250 may also be configured to store other instrumentation graphics instructions, such as register-value-storage instructions.

In various embodiments, these stored instrumentation graphics instructions may facilitate the GP 290 in performing collection of graphics profile information. Thus, during execution, the one or more graphics processors 205, in response to executing each TSI 140, may store timestamps in memory (not illustrated). The one or more graphics processors 205 may, in various embodiments, store the timestamps in memory such as graphics memory or other memory accessible by the one or more graphics processors 205. The one or more graphics processors 205 may also execute the TI 150. After execution of TSI 140s and the TI 150, the one or more graphics processors 205 may be configured, in response to execution of the IGI 170, to generate an interrupt for receipt by the GP 290. It may be noted that, while particular embodiments described herein utilize an interrupt for notification of the GP 290 that graphics profile information collection can begin, in other embodiments, other notification techniques may be utilized. The one or more graphics processors 205 may also execute the EWI 180, causing the one or more graphics processors 205 to pause execution during collection of graphics profile information.

In response to receiving the interrupt, the GP 290 may begin collection of graphics profile information. Collection may be performed, in various embodiments, by requesting graphics profile information from the one or more graphics processors 205 or by accessing memory in which the one or more graphics processors 205 have stored the graphics profile information. In various embodiments, graphics profile information may include information such as timestamp information or register values (or other values) stored by the one or more graphics processors 205. Upon completion of the GP 290 collecting graphics profile information, the GP 290 may send a continue event to the one or more graphics processors 205, which may then resume execution.

Figure 3:
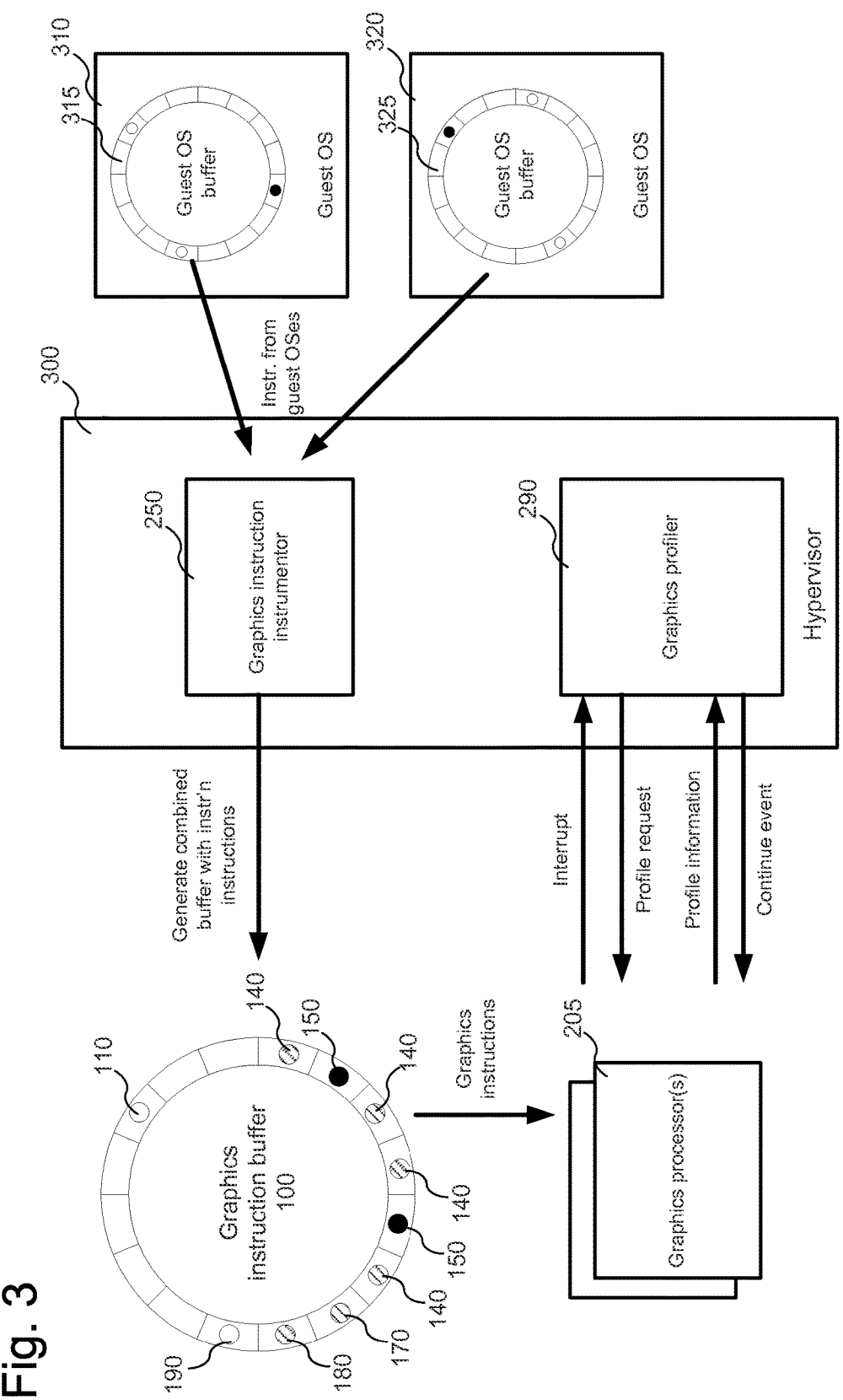
FIG. 3 illustrates an example arrangement and information flows for a graphics instruction instrumentor and graphics profiler to profile execution of graphics instructions in a hypervisor, in accordance with various embodiments.

FIG. 3 illustrates an example arrangement and information flows for a GII 250 and GP 290 to profile execution of graphics instructions in a hypervisor 300, in accordance with various embodiments. In the example of FIG. 3, the hypervisor 300, in contrast to the KMD 200 of FIG. 2, may be configured to sit between one or more guest operating systems, such as the illustrated guest OS 310 and 320, and hardware in a computing device. In various embodiments, the guest OSes 310 and 320 may each include a guest OS graphics buffer (e.g., guest OS graphics buffers 315 and 325, respectively, illustrated in FIG. 3 as ring buffers, but which may be implemented in variety of ways in various embodiments). The 250, in various embodiments, may be configured to capture graphics instructions from each of the guest OS graphics buffers 315 and 325 and to generate instructions (including instrumentation graphics instructions) for the GIB 100. Thus, in the example of FIG. 3, multiple TI 150s, which may each be generated at different guest OSes, have been stored into the GIB 100 by the GII 250. Additionally, the GII 250 has stored TSI 140s in association with each of these TI 150s. As illustrated, the GII 100 still contains an IGI 170 and EWI 180 to facilitate collection of graphics profile information by the GP 290. However, as illustrated, in some embodiments a single combination IGI 170 and EWI 180 may be used to collect graphics profile information about multiple TI 150s.

Figure 4:
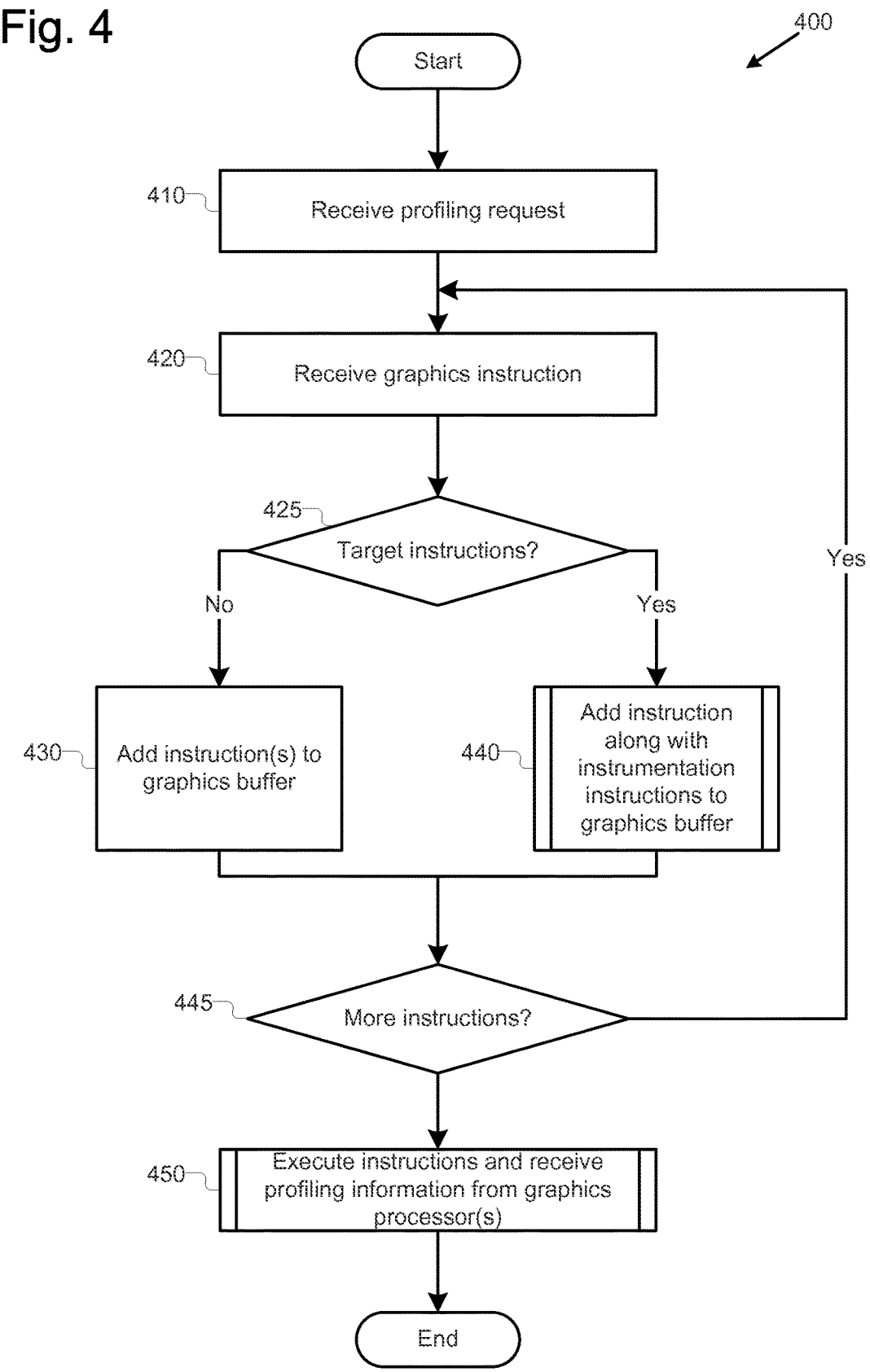
FIG. 4 illustrates an example process for profiling execution of graphics instructions, in accordance with various embodiments.

FIG. 4 illustrates an example process 400 for profiling execution of graphics instructions, in accordance with various embodiments. While particular operations and sub-processes are shown in a particular order, it may be recognized that, in various embodiments, the operations may be re-ordered, combined, split into additional operations or processes, and/or omitted altogether. The process may begin at operation 410, where the GU 250 may receive a profiling request. In various embodiments, the GII 250 may receive, in the profiling request, information about desired levels of profiling. For example, the GII 250 may receive indications of specific TI 150s, code blocks, and/or applications that for which graphics profiling information is desired. Various other techniques for identifying levels of profiling may be utilized, as may be understood.

Next, at operation 420, the GII 250 may receive a graphics instruction. In various embodiments, this graphics instruction may be received directly from an application, such as in the scenario of the KMD 200 of FIG. 2, or the graphics instruction may be obtained by the GII operating in a hypervisor 300 from guest S graphics buffers, as in the scenario of FIG. 3. In other embodiments, other techniques for receiving graphics instructions may be utilized. Next, at decision operation 425, the GII 250 may determine whether the currently-received instruction is a target instruction, i.e. has it been identified as being desired for profiling information, or not. If not, then at operation 430, the GII 250 may add the received graphics instruction to the GIB 100. If the received graphics instruction is a TI 150, however, then at operation 440, the GII 250 may add the received instruction to the GIB 100 along with instrumenting graphics instructions. Particular implementations of operation 440 may be described below with relation to process 500 of FIG. 5.

In either event, process 400 may proceed to decision operation 445 where it may be determined whether more instructions are available to be received. If so, the process may be repeated at operation 420. If not, then at operation 450, the one or more graphics processors 205 may execute graphics instructions in the GIB 100 and facilitate the GP 290 in collecting graphics profile information from the one or more graphics processors 205. It may be noted that, while the illustration of FIG. 4 implies that all instrumentation may be complete before graphics instructions are executed by the one or more graphics processors 205, this is done merely for the sake of simplified illustration. In various embodiments, however, execution of graphics instructions and collection of graphics profile information by the GP 290 may be performed alongside instrumentation of graphics instructions by the GII 250. Thus, operation 450 may, in various embodiments, be performed in parallel with performance of operations 410-445. After performance of operation 450, the process may then end.

Figure 5:
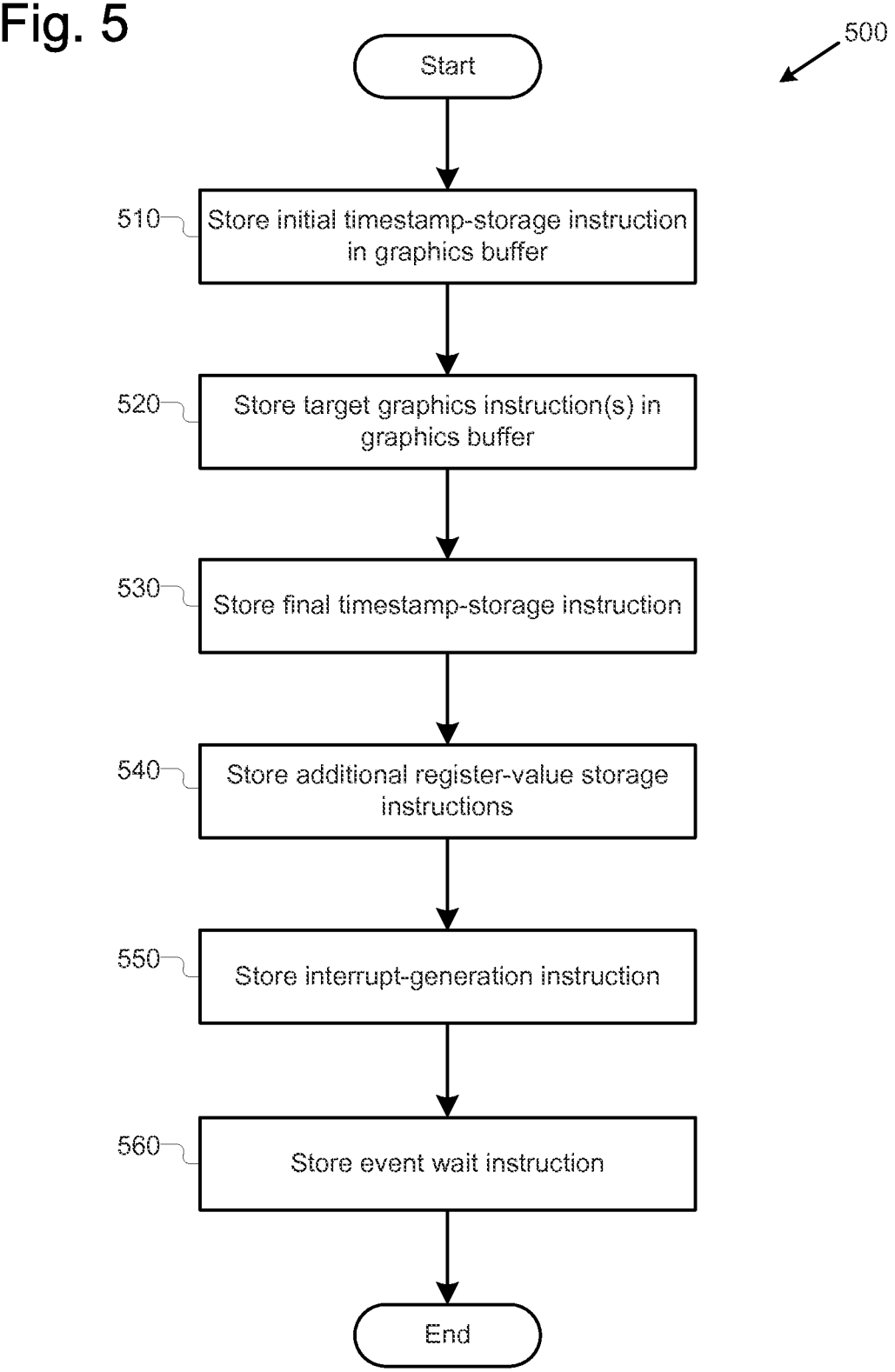
FIG. 5 illustrates an example process for adding instructions, including instrumentation graphics instructions, to a graphics instruction buffer, in accordance with various embodiments.

FIG. 5 illustrates an example process 500 for adding instructions, including instrumentation graphics instructions, to a graphics instruction buffer, in accordance with various embodiments. While particular operations and sub-processes are shown in a particular order, it may be recognized that, in various embodiments, the operations may be re-ordered, combined, split into additional operations or processes, and/or omitted altogether. In various embodiments, process 500 may include the storage of multiple graphics instructions in the GIB 100. As stated before, in various embodiments, if the GIB 100 is a ring buffer, the storage of these graphics instructions may include storage of the instructions starting at a tail storage location 190 of the GIB 100, and the tail storage location 190 may be updated after storage of one or more of the graphics instructions.

The process may begin at operation 510, where the 250 may store an initial TSI 140 in the GIB 100. Next, at operation 520, the GII 250 may store the TI 150s for which graphics profiling information is desired. As discussed before, in various embodiments, one or more TS 150s may be stored at operation 520, depending on a particular level for which graphics profiling information is desired. Next, at operation 530, the GII 250 may store a final TSI 140 in the GIB 100. In various embodiments, by storing the TSI 110s immediately prior to and immediately after the TI 150, the GII 250 may provide for more accurate accounting of execution time, as the difference between the two stored timestamps may be substantially close to the execution time of the TI 150. However, in other embodiments, the TSI 140s may be stored in the GIB 100 at other locations.

Next, at operation 540, the GII 250 may store additional register-value storage instructions in the GIB 100, such as instructions to store computational values generated during execution, or values relating to the execution path. Particular values which may be stored for this purpose may be understood to those of ordinary skill. Next, at operation 550, the GII 250 may store an IGI 170 in the GIB 100, followed, at operation 560, by storage of an EWI 180. As mentioned above, however, in various embodiments, the 170 and EWI 180 may not be stored immediately after the TI 150 and its associated TSI 140s. Thus, in some embodiments, additional graphics instructions, TI 150s, and/or TSI 140s may be stored in the GIB 100 before storage of the IGI 170 and the EWI 180. The process may then end.

Figure 6:
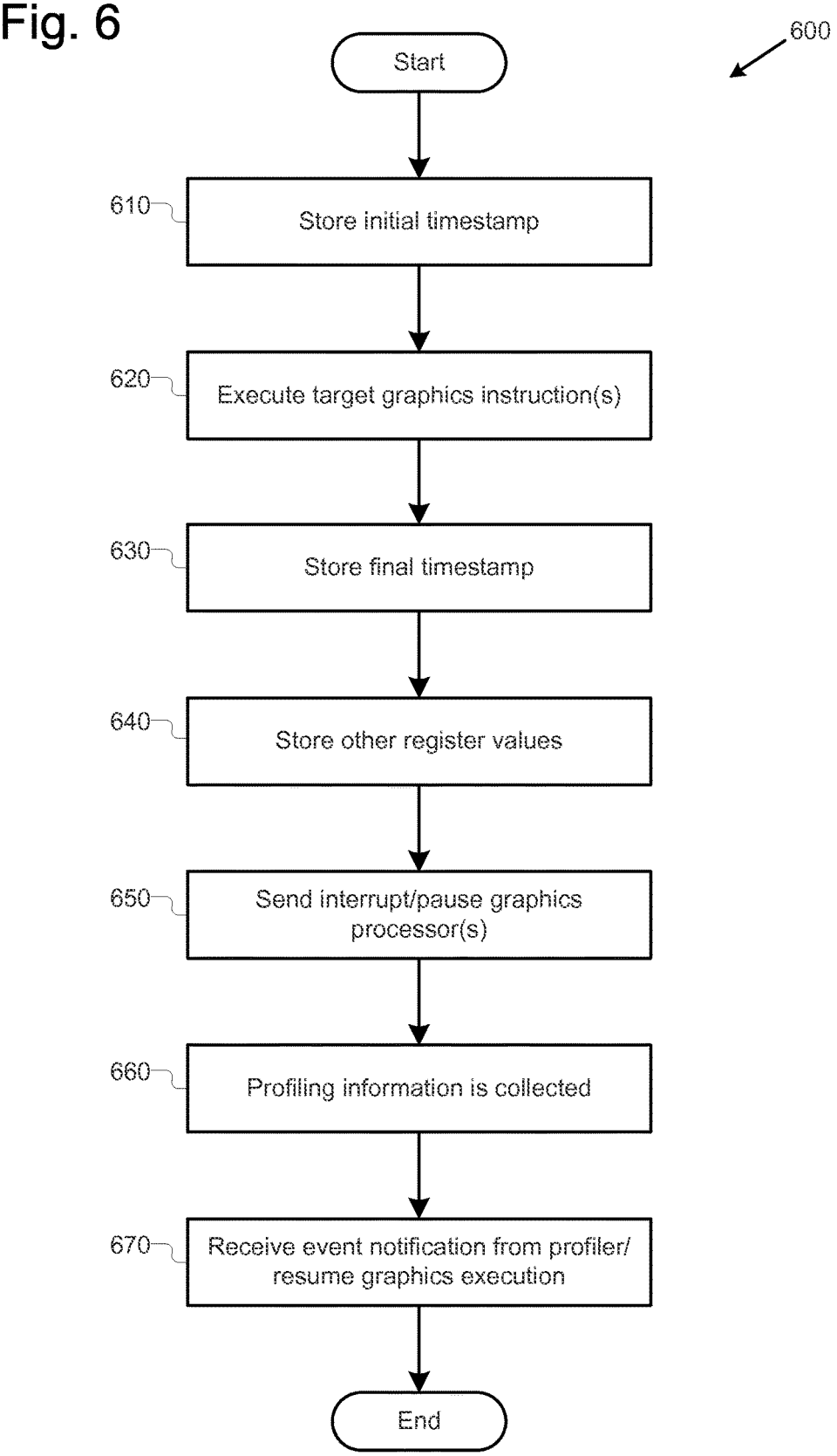
FIG. 6 illustrates an example process for collecting graphics profiling information, in accordance with various embodiments.

FIG. 6 illustrates an example process 600 for collecting graphics profiling information, in accordance with various embodiments. While particular operations and sub-processes are shown in a particular order, it may be recognized that, in various embodiments, the operations may be re-ordered, combined, split into additional operations or processes, and/or omitted altogether. The process may begin at operation 610, where the one or more graphics processors 205 may store an initial timestamp, such as in response to execution of the initial TSI 110. As discussed above, in various embodiments, the one or more graphics processors 205 may store the timestamp in graphics memory, or other memory that is accessible by the one or more graphics processors 205. Next, at operation 620, the one or more graphics processors 205 may execute the TI 150 (or TI 150s). Next, at operation 630, the one or more graphics processors 205 may store a final timestamp in response to execution of the final TSI 140. Next, at operation 640, the one or more graphics processors 205 may store additional register values, such as in response to register-values storage instructions in the GIB 100.

Next, at operation 650, the one or more graphics processors 205, in response to execution of the IGI 170, may send an interrupt to the GP 290 so that it may begin collection of graphics profile information. Additionally, at operation 650, the one or more graphics processors may, in response to execution of the EWI 180, pause execution of further graphics instructions by the one or more graphics processors 205. Next, at operation 660, the GP 290 may collect graphics profile information, such as by accessing graphics memory or other memory in which the timestamps and/or other register values were stored by the one or more graphics processors 205. At operation 670, the GP 290 may then provide a resume event which may be received by the one or more graphics processors 205 and the one or more graphics processors 205 may resume execution of graphics instructions. The process may then end.

Figure 7:
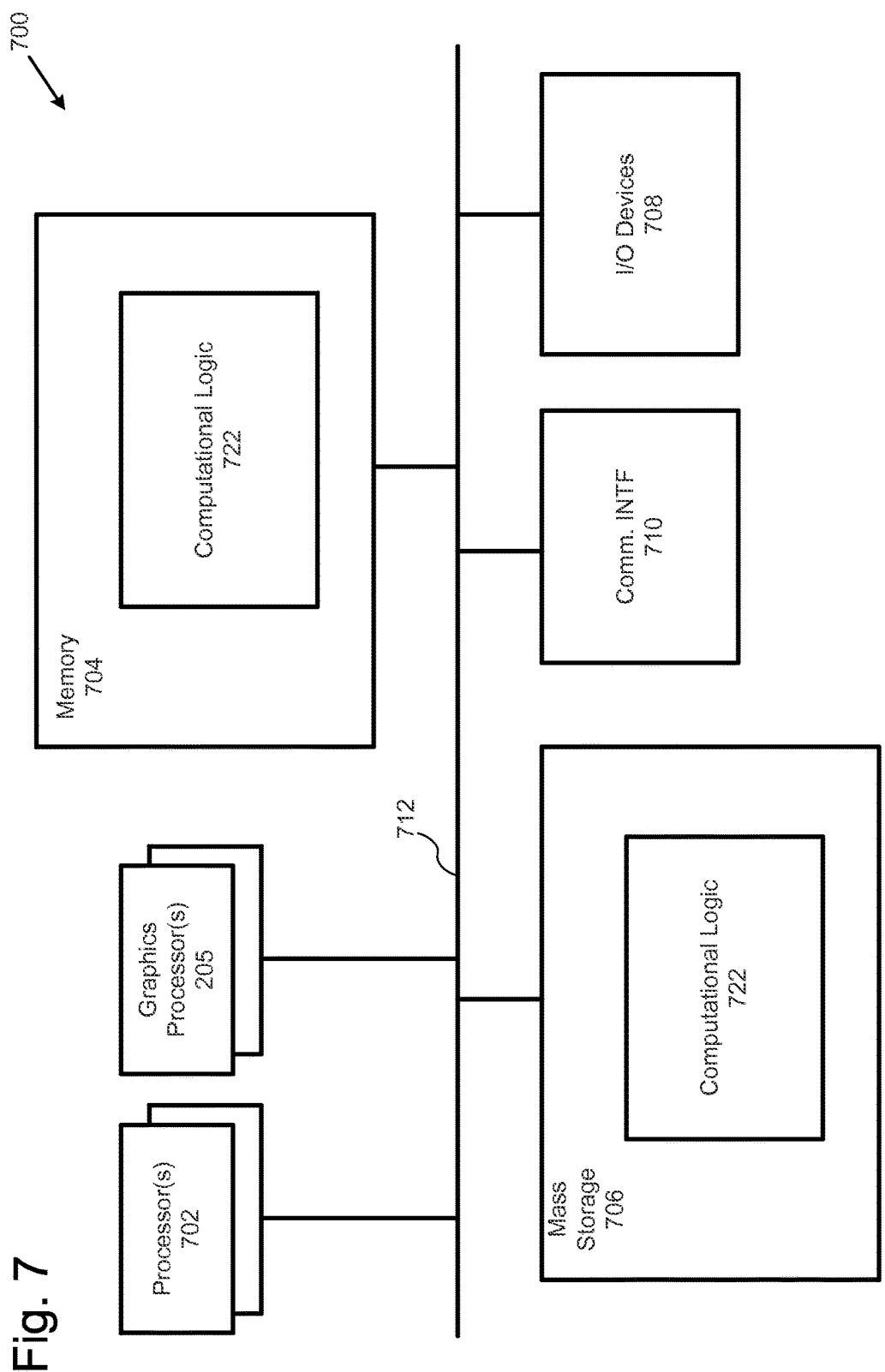
FIG. 7 illustrates an example computing environment suitable for practicing various aspects of the present disclosure in accordance with various embodiments.

Referring now to FIG. 7, an example computer suitable for practicing various aspects of the present disclosure, including processes of FIGS. 4-6, is illustrated in accordance with various embodiments. As shown, computer 700 may include one or more processors (or processor cores) 702, one or more graphics processors (or processor cores) 205, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth, WiFi, Near Field Communications, Radio-frequency identification, and so forth). The elements may be coupled to each other via system bus 712, which may represent one or more buses. in the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing one or more of the modules shown in FIGS. 2 and 3 and/or the operations associated with techniques shown in FIGS. 4-6, collectively referred to as computing logic 722. The various elements may be implemented by assembler instructions supported by processor(s) 702 and or graphics processor(s) 205 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 710-712 may vary. Their constitutions are otherwise known, and accordingly will not be further described.

Figure 8:
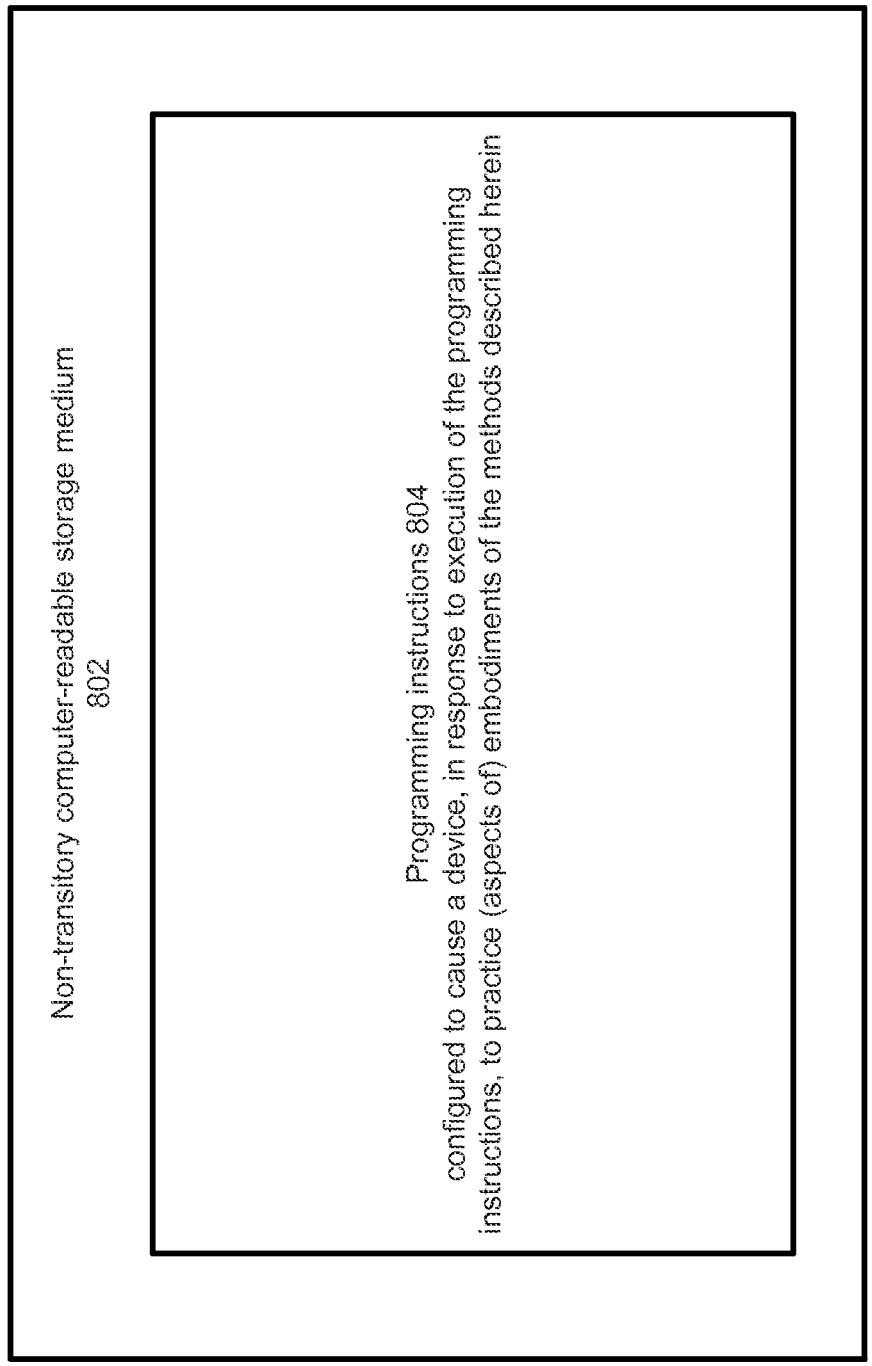
FIG. 8 illustrates an example storage medium with instructions configured to enable an apparatus to practice various aspects of the present disclosure in accordance with various embodiments.

FIG. 8 illustrates an example of at least one computer-readable storage medium 802 having instructions configured to practice all or selected ones of the operations associated with the techniques earlier described, in accordance with various embodiments. As illustrated, least one computer-readable storage medium 802 may include a number of programming instructions 804. Programming instructions 804 may be configured to enable a device, e.g., computer 700, in response to execution of the programming instructions, to perform, e.g., various operations of processes of FIGS. 4-6, e.g., but not limited to, to the various operations performed to perform profiling of execution of graphics instructions. In alternate embodiments, programming instructions 804 may be disposed on multiple least one computer-readable storage media 802 instead.

Referring back to FIG. 7, for one embodiment, at least one of processor(s) 702 and/or graphics processor(s) 205 may be packaged together with memory having computational logic 722 configured to practice aspects of processes of FIGS. 4-6. For one embodiment, at least one of processor(s) 702 and/or graphics processor(s) 205 may be packaged together with memory having computational logic 722 configured to practice aspects of processes of FIGS. 4-6 to form a System in Package (SiP). For one embodiment, at least one of processor(s) 702 and/or graphics processor(s) 205 may be integrated on the same die with memory having computational logic 722 configured to practice aspects of processes of FIGS. 4-6. For one embodiment, at least one of processor(s) 702 and/or graphics processor(s) 205 may be packaged together with memory having computational logic 722 configured to practice aspects of processes of FIGS. 4-6 to form a System on Chip (SoC). For at least one embodiment, the SoC may be utilized in, but not limited to, a computing tablet. (e.g., WiFi, Blue Tooth, Blue Tooth Low Energy, Near Field Communications, Radio-frequency identification (REM), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for computing. The apparatus may include one or more computer processors, and one or more graphics processors, and a graphics instruction buffer to store graphics instructions for execution by the one or more graphics processors. The apparatus may also include a graphics instruction instrumenter (GII) to be operated by the one or more computer processors. The GII may identify graphics instructions to be executed by the one or more graphics processors and store instrumentation graphics instructions on the graphics buffer in association with the identified graphics instructions.

Example 2 may include the apparatus of example 1, wherein the GII may be further to store the identified graphics instructions in the graphics buffer.

Example 3 may include the apparatus of example 1, wherein the GII may be to store instrumentation graphics instructions on the graphics buffer through storage of timestamp-storage instructions in association with one or more identified graphics instructions.

Example 4 may include the apparatus of example 3, wherein the GII may be to store timestamp-storage instructions both before and after one or more identified graphics instructions.

Example 5 may include the apparatus of any of examples 1-4, wherein the apparatus further may include a graphics profiler to be operated by the one or more computer processors to collect graphics profile information from the one or more graphics processors.

Example 6 may include the apparatus of example 5, wherein the GII may be to store instrumentation graphics instructions on the graphics buffer through storage of an interrupt-generation instruction to alert the graphics profiler to collect graphics profile formation.

Example 7 may include the apparatus of example 5, wherein the GII may be to store instrumentation graphics instructions on the graphics buffer through storage of an event-wait instruction to cause the one or more graphics processors to pause execution of further graphics instructions.

Example 8 may include the apparatus of example 7, wherein the graphics profiler may be to send a proceed event to the one or more graphics processors upon completion of the graphics profiler collection of graphics profile information.

Example 9 may include the apparatus of example 5, wherein the graphics profiler may be to collect timestamp information recorded by the one or more graphics processors.

Example 10 may include the apparatus of example 9, wherein the graphics profiler may be to collect timestamp information by collecting timestamps before and after one or more graphics instructions for which graphics profile information is desired.

Example 11 may include the apparatus of any of examples 1-10, and may further include a shadow buffer to store copies of the graphics instructions to be executed by the one or more graphics processors. The GII may be to identify the graphics instructions stored in the shadow buffer prior to storage of the graphics instructions in the graphics instruction buffer.

Example 12 may include the apparatus of any of examples 1-10, and may further including an operating system. The GII may be to operate within the operating system to identify graphics instructions generated in an execution environment managed by the operating system.

Example 13 may include the apparatus of any of examples 1-10, and may further includes an operating system. The GII may be to operate within the operating system and to identify graphics instructions generated in a virtual machine hosted by the operating system.

Example 14 may include the apparatus of example 13, and may further include a hypervisor. The GII may be operated in the hypervisor.

Example 15 may include one or more non-transitory computer-readable media including instructions written thereon that, in response to execution by a computing system, cause the computing system to perform activities. The instructions may cause the computing system to identify graphics instructions to be executed by one or more graphics processors of the computing system. The instructions may also cause the computing system to store instrumentation graphics instructions on a graphics buffer of the computing system. The graphics buffer may be to store graphics instructions for execution by the one or more graphics processors and the instrumentation graphics instructions may be stored in association with the identified graphics instructions.

Example 16 may include the non-transitory computer-readable media of example 15, wherein the instructions may be further to cause the computing system to store the identified graphics instructions in the graphics buffer.

Example 17 may include the non-transitory computer-readable media of example 15, wherein store instrumentation graphics instructions on the graphics buffer may include store timestamp-storage instructions in association with one or more identified graphics instructions.

Example 18 may include the non-transitory computer-readable media of example 17, wherein store timestamp-storage instructions may include store timestamp-storage instructions both before and after one or more identified graphics instructions.

Example 19 may include the non-transitory computer-readable media of any of examples 15-18, wherein the instructions may be further to collect graphics profile information from the one or more graphics processors.

Example 20 may include the non-transitory computer-readable media of example 19, wherein store instrumentation graphics instructions on the graphics buffer may include store an interrupt-generation instruction to initiate collection of graphics profile information.

Example 21 may include the non-transitory computer-readable media of example 19, wherein store instrumentation graphics instructions on the graphics buffer may include store an event-wait instruction to cause the one or more graphics processors to pause execution of further graphics instructions.

Example 22 may include the non-transitory computer-readable media of example 21, wherein the instructions may be further to cause the computing system to send a proceed event to the one or more graphics processors upon completion of collection of graphics profile information.

Example 23 may include the non-transitory computer-readable media of example 19, wherein the instructions may be further to cause the computing system to collect timestamp information recorded by the one or more graphics processors.

Example 24 may include the non-transitory computer-readable media of example 23, wherein collect timestamp information may include collect timestamps before and after one or more graphics instructions for which graphics profile information is desired.

Example 25 may include the non-transitory computer-readable media of any of examples 15-24, wherein: the computing system may include a shadow buffer to store copies of the graphics instructions to be executed by the one or more graphics processors; and the instructions may be further to cause the computing system to identify the graphics instructions stored in the shadow buffer prior to storage of the graphics instructions in the graphics instruction buffer.

Example 26 may include the non-transitory computer-readable media of any of examples 15-24, wherein: the computing system may include an operating system; and the instructions may be to execute in the operating system to cause the computing system to identify graphics instructions generated in an execution environment managed by the operating system .

Example 27 may include the non-transitory computer-readable media of any of examples 15-24, wherein: the computing system may include an operating system; and the instructions may be to execute in the operating system to cause the computing system to identify graphics instructions generated in a virtual machine hosted by the operating system .

Example 28 may include the non-transitory computer-readable media of example 27, wherein: the computing system may include a hypervisor; and the instructions may be to execute in the hypervisor.

Example 29 may include a computer-implemented method. The method may include identifying, by a computing system, graphics instructions to be executed by one or more graphics processors of the computing system. The method may also include storing, by the computing system, instrumentation graphics instructions on a graphics buffer of the computing system. The graphics buffer may be to store graphics instructions for execution by the one or more graphics processors and the instrumentation graphics instructions may be stored in association with the identified graphics instructions.

Example 30 may include the method of example 29, and may further include storing, by the computing system, the identified graphics instructions in the graphics buffer.

Example 31 may include the method of example 29, wherein storing instrumentation graphics instructions on the graphics buffer may include storing timestamp-storage instructions in association with one or more identified graphics instructions.

Example 32 may include the method of example 31, wherein storing timestamp-storage instructions may include storing timestamp-storage instructions both before and after one or more identified graphics instructions.

Example 33 may include the method of any of examples 29-32, and may further include collecting, by the computing system, graphics profile information from the one or more graphics processors.

Example 34 may include the method of example 33, wherein storing instrumentation graphics instructions on the graphics buffer may include storing an interrupt-generation instruction to initiate collection of graphics profile information.

Example 35 may include the method of example 33, wherein storing instrumentation graphics instructions on the graphics buffer may include storing an event-wait instruction to cause the one or more graphics processors to pause execution of further graphics instructions.

Example 36 may include the method of example 35, and may further include sending, by the computing system, a proceed event to the one or more graphics processors upon completion of collection of graphics profile information.

Example 37 may include the method of example 33, and may further include collecting, by the computing system, timestamp information recorded by the one or more graphics processors.

Example 38 may include the method of example 37, wherein collecting timestamp information may include collecting timestamps before and after one or more graphics instructions for which graphics profile information is desired.

Example 39 may include the method of any of examples 29-38, wherein the computing system may include a shadow buffer to store copies of the graphics instructions to be executed by the one or more graphics processors and the method may further include identifying the graphics instructions stored in the shadow buffer prior to storage of the graphics instructions in the graphics instruction buffer.

Example 40 may include the method of any of examples 29-38, wherein the computing system may include an operating system and identifying graphics instructions may include identifying, from within the operating system, graphics instructions generated in an execution environment managed by the operating system.

Example 41 may include the method of any of examples 29-38, wherein the computing system may include an operating system and identifying graphics instructions may include identifying, from within the operating system, graphics instructions generated in a virtual machine hosted by the operating system.

Example 42 may include the method of example 41, wherein the computing system may include a hypervisor and the method may be to execute within the hypervisor.

Example 43 may include an apparatus for computing. The apparatus may include means for identifying graphics instructions to be executed by one or more graphics processors of the apparatus and means for storing instrumentation graphics instructions on a graphics buffer of the apparatus. The graphics buffer may be to store graphics instructions for execution by the one or more graphics processors and the means for storing instrumentation graphics instructions may be to store instrumentation graphics in association with the identified graphics instructions.

Example 44 may include the apparatus of example 43, and may further include means for storing the identified graphics instructions in the graphics buffer.

Example 45 may include the apparatus of example 43, wherein means for storing instrumentation graphics instructions on the graphics buffer may include means for storing timestamp-storage instructions in association with one or more identified graphics instructions.

Example 46 may include the apparatus of example 45 wherein means for storing timestamp-storage instructions may include means for storing timestamp-storage instructions both before and after one or more identified graphics instructions.

Example 47 may include the apparatus of any of examples 43-46, and may further include means for collecting graphics profile information from the one or more graphics processors.

Example 48 may include the apparatus of example 47, wherein means for storing instrumentation graphics instructions on the graphics buffer may include means for storing an interrupt-generation instruction to initiate collection of graphics profile information.

Example 49 may include the apparatus of example 47, wherein means for storing instrumentation graphics instructions on the graphics buffer may include means for storing an event-wait instruction to cause the one or more graphics processors to pause execution of further graphics instructions.

Example 50 may include the apparatus of example 49, and may further include means for sending a proceed event to the one or more graphics processors upon completion of collection of graphics profile information.

Example 51 may include the apparatus of example 47, and may further include means for collecting timestamp information recorded by the one or more graphics processors.

Example 52 may include the apparatus of example 51, wherein means for collecting timestamp information may include means for collecting timestamps before and after one or more graphics instructions for which graphics profile information is desired.

Example 53 may include the apparatus of any of examples 43-52, wherein the apparatus may further include a shadow buffer to store copies of the graphics instructions to be executed by the one or more graphics processors and means for identifying the graphics instructions stored in the shadow buffer prior to storage of the graphics Instructions in the graphics instruction buffer.

Example 54 may include the apparatus of any of examples 43-52, wherein the apparatus may include an operating system and means for identifying graphics instructions may include means for identifying, from within the operating system, graphics instructions generated in an execution environment managed by the operating system.

Example 55 may include the apparatus of any of examples 43-52, wherein the apparatus may include an operating system and means for identifying graphics instructions may include means for identifying, from within the operating system, graphics instructions generated in a. virtual machine hosted by the operating system.

Example 56 may include the apparatus of example 41, wherein the apparatus t ay include a hypervisor and the means for identifying and means for storing may be to operate within the hypervisor.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
   one or more computer processors;
   one or more graphics processors;
   a graphics instruction buffer to store graphics instructions for execution by the one or more graphics processors;
   a graphics profiler to be operated by the one or more computer processors to collect graphics profile information from the one or more graphics processors; and
   a graphics instruction instrumentor (GII) to be operated by the one or more computer processors to:
      identify the graphics instructions to be executed by the one or more graphics processors; and
      store instrumentation graphics instructions on the graphics instruction buffer, through storage of an interrupt-generation instruction to alert the graphic profiler to collect the graphics profile information or through storage of an event-wait instruction to cause the one or more graphics processors to pause execution of further graphics instructions, in association with the identified graphics instructions.

2. The apparatus of claim 1, wherein the GII is to store timestamp-storage instructions both before and after one or more of the identified graphics instructions.

3. The apparatus of claim 1, wherein the graphics profiler is to send a proceed event to the one or more graphics processors upon completion of collection of the graphics profile information.

4. The apparatus of claim 1, further comprising a shadow buffer to store copies of the graphics instructions to be executed by the one or more graphics processors, wherein the GII is to identify the graphics instructions stored in the shadow buffer prior to storage of the graphics instructions in the graphics instruction buffer.

5. The apparatus of claims 1, further comprising an operating system, wherein the GII is to operate within the operating system to identify graphics instructions generated in an execution environment managed by the operating system .

6. The apparatus of claim 1, further comprising an operating system;

wherein the GII is to operate within the operating system; and wherein the GII is to identify graphics instructions generated in a virtual machine hosted by the operating system.

7. An apparatus for computing, comprising,
one or more computer processors,
one or more graphics processors:
a graphics instruction buffer to store graphics instructions for execution by the one or more graphics processor;
a graphics instrumentor (GII) to be operated by the one or more computer processor to:
   identify the graphics instructions to be executed by the one or more graphics processors; and
   store instrumentation graphics instructions on the graphics instruction buffer in association with the identified graphics instructions, and
a graphics profiler to be operated by the one or more computer processors to:
   collect graphics profile information from the one or more graphics processors; and
   collect timestamp information recorded by the one or more graphics processors.

8. The apparatus of claim 7, wherein the graphics profiler is to collect the timestamp information by collecting timestamps before and after one or more graphics instructions for which the graphics profile information is collected.

9. One or more non-transitory computer-readable media comprising instructions written thereon that, in response to execution by a computing system, cause the computing system to:
   identify graphics instructions to be executed by one or more graphics processors of the computing system;
   store instrumentation graphics instructions on a graphics buffer of the computing system, wherein to store the instrumentation graphics instructions on the graphics buffer comprises to store an event-wait instruction to cause the one or more graphics processors to pause execution of further graphics instruction, and wherein the graphics buffer is to store the graphics instructions for execution by the one or more graphics processors and the instrumentation graphics instructions are stored in association with the identified graphics instructions; and
   cause the computing system to send a proceed event to the one or more graphics processors upon completion of collection of graphics profile information.

10. The non-transitory computer-readable media of claim 9, wherein to store the instrumentation graphics instructions on the graphics buffer comprises to store timestamp-storage instructions in association with the identified graphics instructions.

11. The non-transitory computer-readable media of claim 9, wherein to store the instrumentation graphics instructions on the graphics buffer comprises to store an interrupt-generation instruction to initiate the collection of the graphics profile information.

12. The non-transitory computer-readable media of claim 9, wherein:
   the computing system comprises a shadow buffer to store copies of the graphics instructions to be executed by the one or more graphics processors; and
   the instructions are further to cause the computing system to identify the graphics instructions stored in the shadow buffer prior to storage of the graphics instructions in the graphics buffer.

13. A computer-implemented method, comprising:
   identifying, by a computing system, graphics instructions to be executed by one or more graphics processors of the computing system;
   storing, by the computing system, instrumentation graphics instructions on a graphics buffer of the computing system, wherein the graphics buffer is to store graphics instructions for execution by the one or more graphics processors and the instrumentation graphics instructions are stored in association with the identified graphics instructions, and wherein storing the instrumentation graphics instructions on the graphics buffer comprises storing an interrupt-generation instruction to initiate collection of graphics profile information and storing an event-wait instruction to cause the one or more graphics processors to pause execution of further graphics instructions; and
   collecting by the computing system, the graphics profile information from the one or more graphics processors.

14. The method of claim 13, wherein storing the instrumentation graphics instructions on the graphics buffer comprises storing timestamp-storage instructions in association with the identified graphics instructions.

* * * * *